United States Patent
Valsesia et al.

(10) Patent No.: US 10,133,924 B2
(45) Date of Patent: Nov. 20, 2018

(54) METHOD FOR FINGERPRINT MATCHING AND CAMERA IDENTIFICATION, DEVICE AND SYSTEM

(71) Applicant: POLITECNICO DI TORINO, Turin (TO) (IT)

(72) Inventors: Diego Valsesia, Borgomanero (IT); Giulio Coluccia, Grugliasco (IT); Tiziano Bianchi, Prato (IT); Enrico Magli, Turin (IT)

(73) Assignee: Politecnico Di Torino, Turin (TO) (IT)

( * ) Notice: Subject to any disclaimer, the term of this patent is extended or adjusted under 35 U.S.C. 154(b) by 27 days.

(21) Appl. No.: 15/325,698

(22) PCT Filed: Jul. 16, 2015

(86) PCT No.: PCT/IB2015/055400
§ 371 (c)(1),
(2) Date: Jan. 11, 2017

(87) PCT Pub. No.: WO2016/012915
PCT Pub. Date: Jan. 28, 2016

(65) Prior Publication Data
US 2017/0169293 A1 Jun. 15, 2017

(30) Foreign Application Priority Data
Jul. 21, 2014 (IT) ................................ TO2014A0574

(51) Int. Cl.
*G06K 9/46* (2006.01)
*G06K 9/00* (2006.01)
(Continued)

(52) U.S. Cl.
CPC ... *G06K 9/00577* (2013.01); *G06F 17/30256* (2013.01); *G06K 9/44* (2013.01); *G06K 9/6202* (2013.01); *G06K 2009/00583* (2013.01)

(58) Field of Classification Search
CPC .... G06K 9/6202; G06K 9/00577; G06K 9/44; G06K 9/46; G06K 2009/00583; G06F 17/30256; G06F 17/30799
See application file for complete search history.

(56) References Cited

U.S. PATENT DOCUMENTS

2012/0195476 A1* 8/2012 Bayram ............ G06F 17/30799
382/124
2014/0310269 A1* 10/2014 Zhang ............... G06F 17/30749
707/725

(Continued)

FOREIGN PATENT DOCUMENTS

WO 2008/045139 A2 4/2008
WO 2009/115611 A2 9/2009
WO 2009/149408 A2 12/2009

OTHER PUBLICATIONS

Ella Bingham et al., *Random Projection in Dimensionality Reduction: Applications to Image and Text Data*, Proceedings of the 7th ACM Sigkdd International Conference on Knowledge Discovery and Data Mining, San Francisco, California, Aug. 26-29, 2001, pp. 245-250, XP007911116.

(Continued)

*Primary Examiner* — Ali Bayat
(74) *Attorney, Agent, or Firm* — Workman Nydegger

(57) ABSTRACT

A method for fingerprint matching and camera identification includes reading, through a device, a camera fingerprint extracted from a picture taken by a camera, and calculating (Continued)

a compressed version of the camera fingerprint through a random projections technique.

16 Claims, 4 Drawing Sheets

(51) Int. Cl.
*G06F 17/30* (2006.01)
*G06K 9/44* (2006.01)
*G06K 9/62* (2006.01)

(56) References Cited

U.S. PATENT DOCUMENTS

2017/0160135 A1* 6/2017 Golub .................. G01J 3/2823
2018/0109840 A1* 4/2018 Stathacopoulos .... G06K 9/6215

OTHER PUBLICATIONS

Miroslav Goljan et al., *Managing a Large Database of Camera Fingerprint*, Proceedings of SPIE, vol. 7541, Jan. 27, 2010, 12 pages, XP055176683.

Yair Rivenson et al., *Compressed Imaging with a Separable Sensing Operator*, IEEE Signal Processing Letters, vol. 16, No. 6, Jun. 2009, pp. 449-452, XP011253628.

Waheed U. Bajwa et al., *Toeplitz-Structured Compressed Sensing Matrices*, Statistical Signal Processing, Aug. 1, 2007, pp. 294-298, XP031134077.

Joel A. Tropp et al., *Random Filters for Compressive Sampling and Reconstruction*, Speech and Signal Processing May 14-19, 2006, vol. 3, pp. III-872-III-885, XP010930618.

Vojtech Holub et al., *Random Projections of Residuals for Digital Image Steganalysis*, IEEE Transaction on Information Forensic and Security, vol. 8, No. 12, Dec. 2013, pp. 1996-2006, XP055177053.

Jessica Fridrich, *Digital Image Forensics*, IEEE Signal Processing Magazine, vol. 26, No. 2, Mar. 1, 2009, pp. 26-37, XP011268063.

Richard G. Baraniuk et al., *Model-Based Compressive Sensing*, IEEE Transaction on Information Theory, vol. 56, No. 4, Apr. 2010, pp. 1982-2001, XP011305724.

Ondrej Chum et al., *Scalable Near Identical Image and Shot Detection*, ACM, Jan. 1, 2007, pp. 549-556, XP055176972.

Kurt Rosenfeld et al., *A Study of the Robustness of PRNU-Based Camera Identification*, Processing of SPIE-IS&T Electronic Imaging, vol. 7254, 2009, pp. 1-7, XP040494340.

Thomas Gloe et al., *Can We Trust Digital Image Forensics?*, Proceedings of the 15th International Conference on Multimedia, Jan. 1, 2007, pp. 78-86, XP055140526.

International Search Report dated Sep. 14, 2015, issued in PCT Application No. PCT/IB2015/055400, filed Jul. 16, 2015.

International Preliminary Report on Patentability dated Jan. 24, 2017, issued in PCT Application No. PCT/IB2015/055400, filed Jul. 16, 2015.

* cited by examiner

METHOD FOR FINGERPRINT MATCHING AND CAMERA IDENTIFICATION, DEVICE AND SYSTEM

FIELD OF THE INVENTION

The present invention relates to a method for fingerprint matching and camera identification, device and system thereof.

DESCRIPTION OF THE PRIOR ART

Imaging sensor imperfections can be considered as a unique fingerprint identifying a specific acquisition device, enabling various important forensic tasks, such as device identification, device linking, recovery of processing history, detection of digital forgeries, as shown in the document of J. Fridrich, "Digital image forensics", 2009. The most common camera fingerprint is the PRNU ("Photo-Response Non-Uniformity") of digital imaging sensor (see also J. Lukas, J. Fridrich, and M. Goljan, "Determining digital image origin using sensor imperfections," in Proc. SPIE Electronic Imaging, Image and Video Communication and Processing, vol. 5685, 2005, pp. 249-260.).

Indeed, sensor imperfections in the form of photo-response non-uniformity patterns are a well-established fingerprinting technique to link pictures to the camera sensors that acquired them. The PRNU is due to slight variations in the properties of individual pixels, which produce a noise-like, yet deterministic pattern affecting every image taken by a sensor. Several works have demonstrated that the PRNU is a robust fingerprint, usually surviving processing like lossy compression and image resizing (see J. Lukas, J. Fridrich, and M. Goljan, "Digital camera identification from sensor pattern noise" Information Forensics and Security, IEEE Transactions on, vol. 1, no. 2, pp. 205-214, June 2006, and M. Chen, J. Fridrich, M. Goljan, and J. Lukas, "Determining image origin and integrity using sensor noise", Information Forensics and Security, IEEE Transactions on, vol. 3, no. 1, pp. 74-90, March 2008).

It is also noted that the PRNU of imaging sensors is a property unique to each sensor array due to the different ability of each individual optical sensor to convert photons to electrons. This difference is mainly caused by impurities in silicon wafers and its effect is a noise pattern affecting every image taken by that specific sensor. Hence, the PRNU can be thought of as a wideband fingerprint of the sensor used to take a specific picture or a set of pictures. The PRNU is multiplicative, i.e. if an imaging sensor is illuminated ideally with a uniform intensity i, neglecting other sources of noise, the output of the sensor will be $o=i+i\cdot k$, where k represents the matrix characterizing the PRNU values and $i\cdot k$ denotes the elementwise product between i and k. The term k exhibits the following properties: it has the same pixel size as the sensor, and carries enough information to make it unique to each sensor. It is universal in the sense that every optical sensor exhibits PRNU. It is present in each picture taken by a sensor except from completely dark ones (due to its multiplicative nature). It is stable under different environmental conditions and it is robust to several signal processing operations. The PRNU characterizing one sensor can be extracted from a set of images (typically, 20 to 50 smooth images are enough). The procedure to extract the fingerprint of a sensor from a set of pictures depends on the model used to characterize the optical sensor.

Thus, in the case of PRNU, the camera fingerprint is essentially a pattern with the same size as the imaging sensor. Due to the wide availability of sensors counting tens of millions of pixels, a realistic database of a few thousand sensors will require to store more than $10^{10}$ individual pixel values in uncompressed format. In addition, the complexity of looking for a particular fingerprint in a large database is also very high, typically requiring the computation of a correlation with each fingerprint in the database.

Another problem with PRNU fingerprints is that the test image should be geometrically aligned with the fingerprint in the database. A possible solution is to provide several versions of the same fingerprint with different scale and/or cropping factors, however at the cost of managing an even larger database.

Recently, several authors started to address the problems related with the management of a large database of camera fingerprints.

In the documents M. Goljan, J. Fridrich, and T. Filler, "Managing a large database of camera fingerprints", 2010 and Y Hu, B. Yu, and C. Jian, "Source camera identification using large components of sensor pattern noise", 2009, the authors propose a so-called fingerprint digest, which works by keeping only a fixed number of the largest fingerprint values and their positions, so that the resulting database is independent of the sensor resolution.

An improved search strategy based on fingerprint digest is proposed in the document Y. Hu, C.-T. Li, Z. Lai, and S. Zhang, "Fast camera fingerprint search algorithm for source camera identification", 2012.

Fingerprint digest can also be used to ease fingerprint registration in the case of geometrically distorted images, as shown in M. Goljan and J. Fridrich, "Sensor fingerprint digests for fast camera identification from geometrically distorted images", 2013. An alternative solution is to represent sensor fingerprints in binary-quantized form as shown in S. Bayram, H. Sencar, and N. Memon, "Efficient sensor fingerprint matching through fingerprint binarization", 2012: even though the size of binary fingerprints scales with sensor resolution, binarization can considerably speed-up the fingerprint matching process.

However, none of the above cited documents indicate how to significantly reduce camera fingerprint database sizes while maintaining effective fingerprint matching and camera identification processes.

It is the main object of the present invention to indicate a method, a device and a system for fingerprint matching and camera identification that allow to reduce camera fingerprint database size.

It is a further object of the present invention to indicate a method, a device and a system for fingerprint matching and camera identification that allow to reduce the computational complexity of the fingerprint matching and camera identification processes, with respect to the prior art.

These and other objects of the invention are achieved by a method, a device and a system for fingerprint matching and camera identification, as claimed in the appended claims, which are intended to be an integral part of the present description.

SUMMARY OF THE INVENTION

In short, it is disclosed a method for fingerprint matching and camera identification, wherein it is provided for compressing a camera fingerprint by using a random projections technique, in particular real-valued or quantized random projections.

Furthermore, the complexity of calculating random projections has been decreased, with respect to the prior art, by using circulant matrices, in particular in their partial form.

Thus, in this case, it is possible to use the FFT ("Fast Fourier Transform") for calculating the compressed fingerprint.

The invention also refers to a device, in particular a computer, and to a system that are configured to implement said method.

Finally, the invention also refers to a computer product comprising portions of software code adapted to implement said method.

Further features of the invention are set out in the appended claims, which are intended to be an integral part of the present description.

BRIEF DECSRIPTION OF THE DRAWINGS

The above objects will become more apparent from the following detailed description of a method, a device and a system for fingerprint matching and camera identification, with particular reference to the annexed drawings, wherein.

DETAILED DESCRIPTION OF THE PREFERRED EMBODIMENTS

Figure 1:
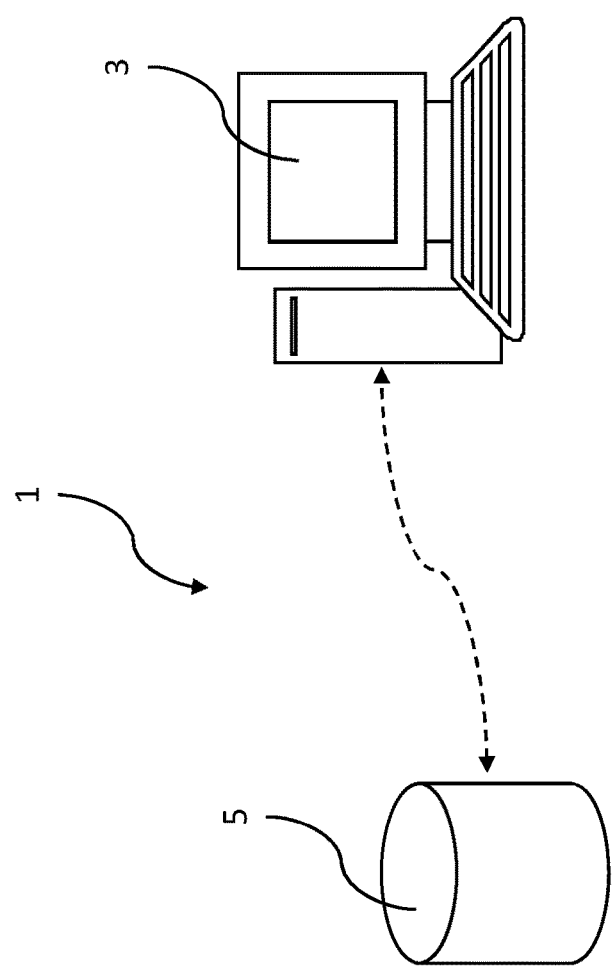
FIG. 1 shows a system according to the present invention.

With reference to FIG. 1, it is shown a system 1 used as an example of system scenario to explain the detailed description of the present invention. The system 1 comprises a device 3, in particular a computer or a smartphone or a tablet, and memory means 5, in particular a database 5, which the device 3 is associable to. More in detail, the device 3 may comprise said memory means 5 or said memory means 5 are in a remote location and they are telematically connectable with the computer 3. Thus, the device 3 and memory means 5 are able to communicate with each other and said device 3 is able to read and write data from and to the memory means 5.

The device 3 is configured to implement the method according to the present invention that will be described more in detail in the following; the database 5 comprises camera fingerprint estimates, and optionally a set of pictures acquired by the same camera or cameras, which can be used to extract a fingerprint estimate, and other information associated to them. Such an information may be the name and/or the model and/or the manufacturer of the camera or parameters of the compression method according to the present invention. Said camera fingerprint estimates may be thus compressed according to the method of the present invention.

For fingerprint matching and camera identification, a test image or a set of images, for which it is desired to know the camera that took it/them, is/are processed for extracting its fingerprint. The goal is to determine which device, i.e. a camera, stored in the database 5 (if present) has acquired the given pictures (test image/images). Essentially, a correlation operation is calculated between the compressed fingerprint of the test image/images and all fingerprint estimates, and if one fingerprint yields a correlation that is large enough, it is declared to be correct.

For extracting the fingerprint from an image or a set of images, the PRNU is typically calculated.

The method of the present invention aims to compress fingerprint databases with slight or ideally no information loss, because nowadays databases can rapidly grow in size.

Said method is based on the random projection (RP) technique. The RP technique is a low-complexity and powerful method for dimensionality reduction. The idea of RP is to project the original n-dimensional data to a m-dimensional subspace, with m<n, using a random matrix $\Phi \in \mathbb{R}^{m \times n}$. Hence, a collection of N n-dimensional data $D \in \mathbb{R}^{n \times N}$ is reduced to a m-dimensional subspace $A \in \mathbb{R}^{m \times N}$ by the following formula:

$$A = \Phi D \quad (1)$$

The key property behind RP is the Johnson-Lindenstrauss lemma, concerning low-distortion embeddings of points from high-dimensional into low-dimensional Euclidean spaces. The lemma states that a small set of points in a high-dimensional space can be embedded into a space of much lower dimension in such a way that distances between the points are nearly preserved.

With such assumption, the method of the present invention provides for reading and/or acquiring, through the device 3, a camera fingerprint extracted from a picture taken by a camera, and calculating a compressed version of said camera fingerprint through random projections, namely through a multiplication between a sensing matrix and said camera fingerprint; said sensing matrix having a row size smaller than said camera fingerprint.

It should be considered that: the picture/image is a matrix and it is representable as a column vector, obtained by reading the matrix of the picture/image column by column; the (not compressed) camera fingerprint extracted from the same picture/image is similarly representable as a column vector, and the picture/image and the (not compressed) camera fingerprint extracted from the same picture/image have the same size, namely the two corresponding column vectors have the same number of elements.

More in detail, the sensing matrix can preferably be a random circulant matrix, in particular a random partial circulant matrix. The term "circulant" refers to a matrix whose rows are circularly shifted versions of the first row. The term "partial" refers to the row size of the sensing matrix that is smaller than the size of said camera fingerprint, namely a rectangular matrix with fewer rows than columns. The term "random" refers to the fact that the first row of the sensing matrix comprises random variables generated according to a distribution of choice (e.g. Gaussian random variables).

Other types of sensing matrices can be used, for instance a fully random matrix comprising independent and identically distributed (i.i.d.) Gaussian random variables, or i.i.d. Rademacher random variables, or Bernoulli random variables, or even deterministic sensing matrices.

Hereinafter, applications using the method of compression according to the present invention are described; namely how to apply compression method of the present invention, based on random projections, to forensic tasks such as fingerprint matching and camera identification. It should be also considered the system 1 of FIG. 1, in particular it is assumed that the device 3 is a computer.

Fingerprint Matching

The fingerprint matching problem is presented with the database 5 of fingerprint estimates and a set of pictures acquired by the same camera, which can be used to extract a fingerprint estimate.

Camera fingerprints obtained as PRNU patterns can be approximated as white Gaussian noise, a typical assumption considered in the literature to study the performance of matching systems. This has some important consequences: first, PRNU patterns cannot be compressed by standard methods (e.g. JPEG compression) because they lack the redundancy that could be exploited to perform compression. Furthermore, fingerprints are very incoherent with each other. By incoherence, it is meant that two fingerprints have very low correlation, or in other words, representing them as points in an n-dimensional space, the angle between any pair of fingerprints is wide and close to orthogonality. In fingerprint matching, a dictionary of fingerprints of N known cameras is constructed, which can be represented as a matrix $D \in \mathbb{R}^{n \times N}$. The goal of the classic fingerprint matching problem is finding the column (because in the database 5 each camera fingerprint is a column vector) that is most similar to a test fingerprint $\hat{k} \in \mathbb{R}^n$ that is presented to the computer 3. For clarity, the test fingerprint $\hat{k}$ is the camera fingerprint extracted from the image of which it is desired to know the camera (name, model, manufacturer, etc.) that took it.

To this purpose, one of the most used similarity criteria is the correlation coefficient. In this description, the sample reflective correlation ρ will be considered, defined as follows:

$$\rho(\hat{k}, d_i) = \frac{\langle \hat{k}, d_i \rangle}{\|\hat{k}\|_2 \|d_i\|_2} \quad i = 1, \ldots, N \quad (2)$$

where $d_i$ is the i-th fingerprint belonging to the dictionary D, the term $\langle \hat{k}, d_i \rangle$ is a scalar product, $\|\hat{k}\|_2 = \sqrt{\langle \hat{k}, \hat{k} \rangle}$ and $\|d_i\|_2 = \sqrt{\langle d_i, d_i \rangle}$.

Thus, the method according to the present invention provides to compress the whole database 5 and the test fingerprint $\hat{k}$ representing them through a small number of random projections. This operation can be seen as the product with an m×n sensing matrix Φ:

$$A = \Phi D \quad (3)$$

$$y = \Phi \hat{k} \quad (4)$$

where A is the compressed dictionary of camera fingerprints included in the database 5, D is the original dictionary of camera fingerprints included in the database 5, y is the compressed fingerprint of the test fingerprint $\hat{k}$.

Random projections can effectively reduce the dimension of the space of the fingerprints, thanks to the fact that they approximately preserve the geometry of the set of fingerprints included in the database. Since random projections approximately preserve the angle between any two fingerprints and since this angle is wide thanks to their incoherent nature, the compressive method exhibits robust performance, while dramatically reducing the problem size. The method provides for storing in the database 5 the compressed dictionary A and a way to generate the compressed fingerprint whenever a test pattern (e.g. the test fingerprint $\hat{k}$) is presented, using the same sensing matrix Φ. In order to limit the size of the database 5, it can be expected to store only a seed of a pseudorandom number generator that allows to generate the sensing matrix Φ, and not the entire sensing matrix Φ. Indeed, it is absolutely possible that different fingerprints stored in the database 5 have been obtained through different sensing matrices Φ, and this would increase the size of the database 5 if entire sensing matrices Φ were stored.

As already mentioned, the choice of the sensing matrix Φ is very important, in fact it is possible to use sensing matrices comprising independent and identically distributed (i.i.d.) Gaussian random variables or circulant matrices or others. Although Gaussian matrices can provide the best performance in terms of geometry preservation, they present some drawbacks which make their use in large scale problems fairly complex.

First, it is important to take into account the amount of time taken to generate the sensing matrix Φ from the seed, indeed one needs to generate nm random numbers, which can take a significant amount of time when n is in the order of several millions. In practice, as cited, one cannot typically store the whole sensing matrix Φ as this would require too much memory, so only the seed of a pseudorandom number generator is stored and every time the sensing matrix Φ is generated on-the-fly.

Second, the full matrix by vector multiplication must be carried out for each of the columns of the dictionary D, namely for each of the fingerprints; such operation requires a large amount of time and high computational complexity. In order to avoid such problems, it is better to use partial circulant matrices. Such matrices generate the first row at random (e.g. with i.i.d. Gaussian variables), and all the other rows are just circularly shifted versions of the first row. Performance analysis has shown that circulant matrices perform almost as well as fully random Gaussian matrices, and proofs of the Johnson-Lindenstrauss lemma and of the RIP ("Restricted Isometry Property") are available for such matrices. Circulant matrices provide great advantages because only the first row must be generated at random, and because fast multiplication is available through the FFT ("Fast Fourier Transform"). Thanks to the use of the FFT, the product between the sensing matrix Φ and the dictionary of fingerprints D can be implemented with O(Nn log n) operations instead of O(Nmn) required by fully random i.i.d. matrices, where N is the number of columns of D, namely the number of cameras in database 5, m is the number of rows of the sensing matrix Φ, namely the size of the compressed fingerprint, and n is the number of columns of the sensing matrix Φ, namely the size of the uncompressed fingerprint.

The method of the present invention also provides for applying scalar quantization to the compressed version of the camera fingerprint; scalar quantization can be carried out with an arbitrary number of bits, in particular with 1 bit. The case in which the compressed camera fingerprint is quantized with 1 bit is referred to as binary quantization.

Thus, a further compression can be achieved by quantizing the compressed fingerprint, instead of keeping the floating point values in the compressed fingerprints. Furthermore, it is noted that in the field of 1-bit compressed sensing, random projections with binary quantization implement an embedding that approximately preserves the angle between signals. Since the preservation of the angles is the main interest for the matching problem, it is also possible to consider the case of random projections with binary quantization, obtained as:

$$A = \text{sign}(\Phi D) \quad (5)$$

In the case of compressed fingerprints with binary quantization the correlation coefficient is replaced by the Hamming distance as test metric.

Thus, binary quantization of the compressed fingerprint allows a further compression, e.g. for the database 5.

Being the original angles wide, the Hamming distance from a non-matching fingerprint tends to be much larger than the distance from the correct fingerprint, which is ideally zero. Binary random projections allow to compress significantly, while the performance degradation is limited and the degradation due to binarization is small but it allows to obtain a significant gain in terms of space. Moreover, computing the Hamming distance is a very fast and efficient operation.

Camera Identification

Camera identification problem is conceptually very similar to the fingerprint matching scenario. The main difference is that a single test image is available instead of a set of them. It is noted that the optimal similarity criterion for this problem is the correlation between the noise residual of the image and a modulated version of the fingerprint stored in the database, where the modulating term is the test image. Extending this criterion to the compressed domain, namely to the method of the present invention, is not possible because of the elementwise product between test image and the fingerprints in the database.

Hence, in this case, the method of the present invention provides for using two simplified similarity criteria that can be readily mapped to the compressed domain.

The first simplified criterion correlates the noise residual w of the test image $I_t$ with the fingerprints stored in the database 5. Essentially, this approach eliminates the modulating effect of the test image $I_t$, thus it will be sub-optimal unless the test image $I_t$ is a constant pattern. It is sufficient to apply the sensing matrix $\Phi$ to both noise residual w of the test image $I_t$, of which it is desired to know which camera took it, and at least one fingerprint stored in the database 5 to translate this criterion to the compressed domain as shown by the following formula:

$$\rho(w, d_i) \rightarrow \rho(\Phi w, \Phi d_i) \quad (6)$$

where $\rho$ is the correlation coefficient defined in the formula (2) and $d_i$ is the i-th fingerprint belonging to the dictionary D in the database 5.

The second simplified criterion considers the use of a fingerprint estimate $\hat{k}$ extracted from the single test image $I_t$ instead of the noise residual w. The second criterion then correlates this test fingerprint estimate $\hat{k}$ with the fingerprint stored in the dictionary D, as shown by the following formula:

$$\rho(\hat{k}, d_i) \rightarrow \rho(\Phi \hat{k}, \Phi d_i) \quad (7)$$

Performance Analysis

Hereinafter the performance obtained by the method for fingerprint matching and camera identification according to the present invention is described.

The matching problem is concerned with finding the column of the dictionary that best matches a test compressed pattern. The test compressed fingerprint undergoes a binary hypothesis test for each column of the compressed dictionary. The two hypotheses are defined as:

H0 (null hypothesis): the compressed test fingerprint and the column reference are not from the same camera;
H1 (alternate hypothesis): the compressed test fingerprint and the column reference are from the same camera.

The null hypothesis is rejected whenever the test metric (correlation coefficient or Hamming distance) is above a predefined threshold $\tau$. In this description the following names will be used to refer to different events:

False alarm: the null hypothesis was incorrectly rejected;
Detection: the null hypothesis was correctly rejected;
Correct detection: the null hypothesis was rejected only for the correct camera;
False Detection: the null hypothesis was rejected for at least one wrong camera.

The database used for such analysis is the Dresden image database. Such database is composed of both flatfield images and scenes from indoor and outdoor environments. 53 cameras having both flatfield and natural photos have been selected. The database is created from the flatfield images in order to have high quality fingerprints, while the test images are taken from the natural scenes. The natural photos present varying amounts of details and illumination conditions. All photos are registered to the same sensor orientation.

Figure 2:
FIG. 2 shows performance data of the method according to the present invention.

With reference to FIG. 2, a table comprising the size in bytes of the Dresden database under various conditions is shown. The first column with reference number 7 called "Single precision" refers to the compressed fingerprints having single precision (32 bit according to the IEEE 754 standard) floating point values, while the second column with reference number 9 called "Binary (1 bit)" refers to the binary quantization of the compressed fingerprints. The term m represents the number of rows of the sensing matrix $\Phi$, thus the size of the compressed fingerprint.

It is easy to notice that the size of the compressed database is much smaller than the uncompressed version of the same database. Moreover, when binary quantization of random projections is applied, the compression becomes greater.

Figure 3:
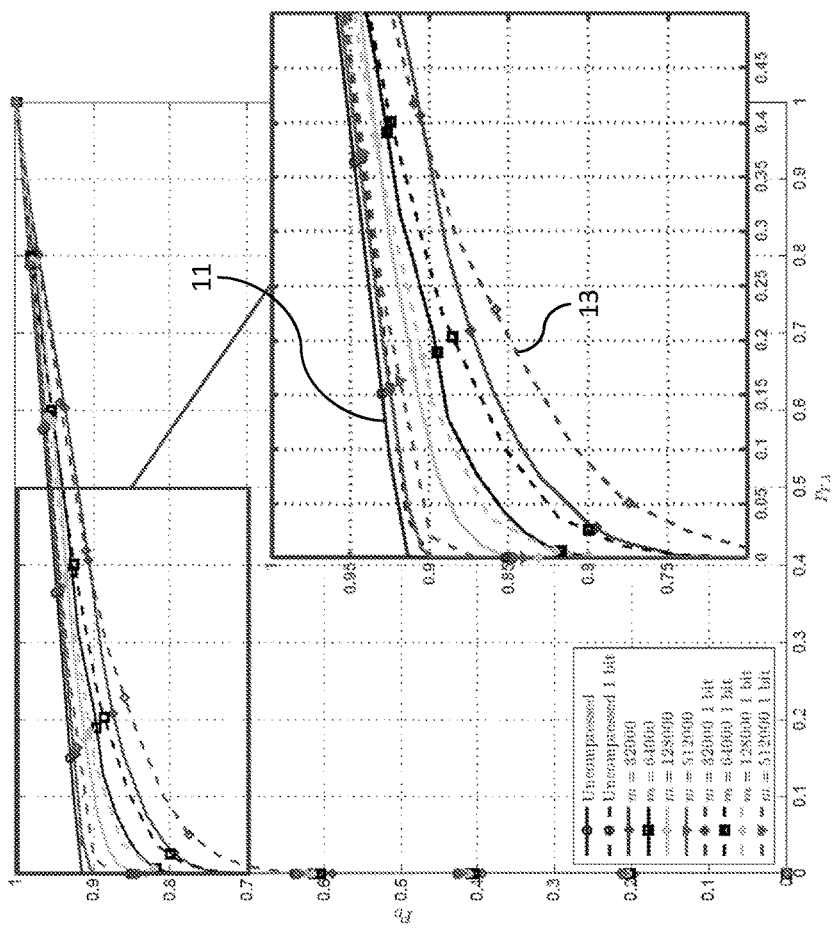
FIG. 3 shows a first graph of experimental results of the method according to the present invention.
Figure 4:
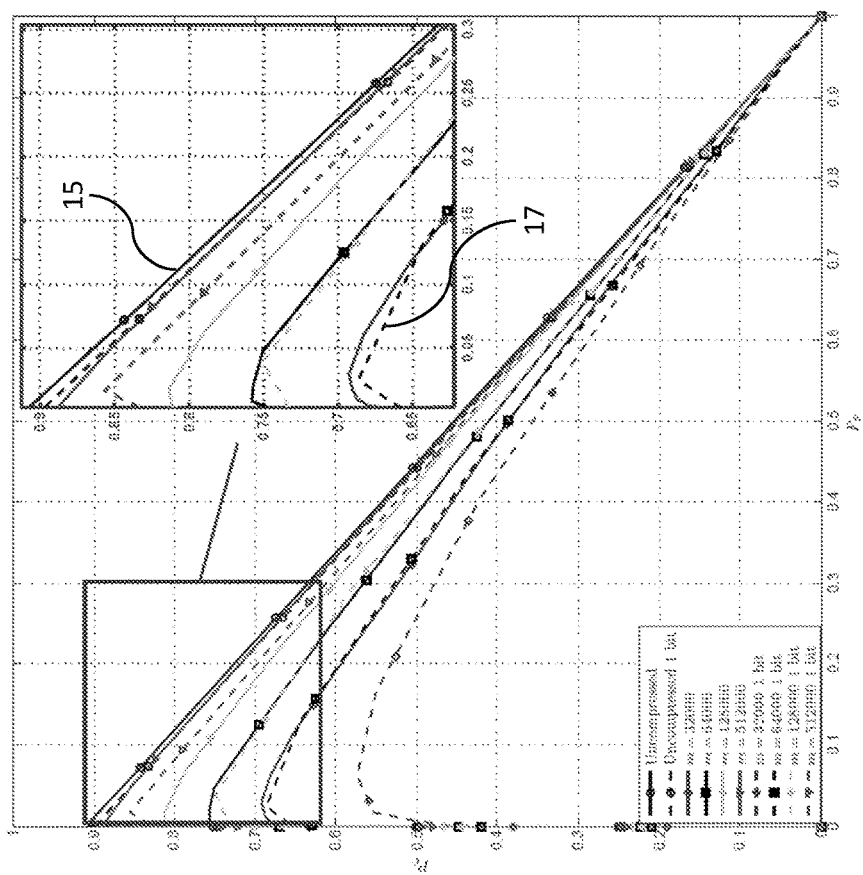
FIG. 4 shows a second graph of experimental results of the method according to the present invention.

With reference to FIGS. 3 and 4, the ROC ("Receiver Operating Characteristic") curves, parameterized by the number of elements m of the compressed fingerprint, are shown.

In particular, FIG. 3 shows the probability of false alarm $P_{FA}$ (in the abscissa) vs. the probability of detection $P_D$ (in the ordinate). The curve with reference number 11 refers to the uncompressed database, while the curve with reference number 13 refers to the compressed database through the method of the present invention with binary quantization and m=32000.

FIG. 4 shows the probability of false detection $P_F$ (in the abscissa) vs. the probability of correct detection $P_C$ (in the ordinate). The curve with reference number 15 refers to the uncompressed database, while the curve with reference number 17 refers to the compressed database through the method of the present invention with binary quantization and m=64000.

From FIGS. 3 and 4, it is experimentally verified that binary random projections have good performance. The gap with respect to real-valued compressed fingerprints (no quantization) is small compared to the significant savings in terms of storage and complexity of the matching operation. It is observed that a process with m binary-quantized random projections typically shows a ROC nearly overlapped to the ROC of a process with m/2 real-valued random projections. Hence, as a rule of thumb a factor of 2 penalty in the number of elements of the compressed fingerprint has to be considered when using binary-quantized random projections. However, storage requirements are reduced by a factor of 64 (in case of double-precision compressed fingerprints), so binary-quantized random projections exhibit extremely competitive performance.

Scale and Rotation

The method according to the present invention takes into account another aspect, namely scale-invariant and rotated versions of the compressed fingerprints, in particular for storing them in the database 5.

What has been described so far considers the creation of a dictionary of compressed fingerprints where each camera sensor is associated to a single entry. An extension of this concept is possible by associating multiple entries to the same camera sensor in order to improve the robustness of the method to transformations such as scaling or the most common rotations. This represents a tradeoff between computation time and memory since the random projections of the transformed pattern are stored in order not to perform any transformation of the test fingerprint at matching time. This construction of the dictionary is called "redundant dictionary".

In this aspect, the goal of the method is to make random projections robust to scale transformations, so that when presented a scaled photo, the system 1 can correctly identify the imaging sensor that acquired it by only keeping a database 5 of random projections of PRNU patterns and computing random projections of the query pattern. To accomplish this goal it is required that the information about the scale is mapped to the compressed domain. Therefore, instead of using a vectorized version of the fingerprint to be compressed, a two dimensional representation is considered and BCCB ("Block Circulant with Circulant Blocks") sensing matrices are used. The use of BCCB sensing matrices allows to preserve the information about the scale on the compressed fingerprint and to efficiently implement the computation of said compressed fingerprint via the two dimensional DFT ("Discrete Fourier Transform"). Random BCCB matrices satisfy the RIP.

Thus, in this case, the method according to the present invention provides that the computation of scale-invariant versions of the compressed fingerprints is implemented via the two dimensional DFT using as sensing matrix Φ a BCCB matrix obtained from a properly scaled random pattern, i.e. based on the size $n_x \times n_y$ of the fingerprint to be compressed (the camera fingerprint), and via properly cropping and rescaling the random projections. The method also provides a technique to correctly crop and rescale the random projections of a test fingerprint to match the compressed fingerprint stored in database 5, using a set of parameters stored in database 5. Said parameters preferably consist in the position and size of the area to be cropped and the size of the uncompressed fingerprint.

The procedure to create a compressed database entry is the following:
Create a random pattern φ (i.i.d. Gaussian) of size $n_x^{max} \times n_y^{max}$, where the size coincides with the maximum sensor size the system 1 deals with;
Given a camera fingerprint K of size $n_x \times n_y$, compute the compressed fingerprint in the following way:
resizing φ to $n_x \times n_y$ to get φ';
computing the random projections as Y=IDFT$_2$[DFT$_2$[K]·DFT$_2$[φ']]. This is equivalent to using a BCCB matrix where the first row is the vectorized version of φ' and multiplying it to a vectorized version of K;
cropping a contiguous area of Y of size $m_x \times m_y$ and store a way to crop the same area from an arbitrarily resized version of Y (e.g., always crop the top-left corner and store the ratios $$\frac{m_x}{n_x} \text{ and } \frac{m_y}{n_y}).$$

The matching process from a test fingerprint is the following:

Given a test fingerprint K' of size $n'_x \times n'_y$, computing the compressed fingerprint in the following way:
resizing φ to $n'_x \times n'_y$ to get φ';
computing the random projections as Y'=IDFT$_2$[DFT$_2$[K']·DFT$_2$[φ']];
cropping the same contiguous area of Y' as in the database (e.g., if it was top-left, then crop the $$\frac{m_x}{n_x} n'_x \times \frac{m_y}{n_y} n'_y$$

pixels);
resizing the cropped area to $m_x \times m_y$;
computing the correlation with the current entry of the dictionary.

It should be noted that the resizing of the cropped random projections of the test fingerprint must be redone for every entry of the dictionary because of the different values of $$\frac{m_x}{n_x} \text{ and } \frac{m_y}{n_y}.$$

In case of binary-quantized compressed fingerprints the database 5 stores the binary-quantized versions of the random projections. During the matching phase the cropped test compressed fingerprints are resized and then quantized. Finally, Hamming distance is preferably used as similarity metric.

In order to be able to detect the camera when the test image has been subject to a rotation the method of the present invention provides for including in the dictionary the random projections of rotated and flipped versions of the fingerprint, including the most common rotations. As an example one might want to include the compressed fingerprints corresponding to the following transformations: rotation by 90°, 180°, 270°, flip upside-down, flip left-right. Preferably, a total of eight combinations are possible, including the original fingerprint.

The features of the present invention, as well as the advantages thereof, are apparent from the above description.

A first advantage of the method for fingerprint matching and camera identification according to the present invention is that it allows to reduce camera fingerprint database size.

A second advantage of the method for fingerprint matching and camera identification according to the present invention is that it allows to reduce the computational complexity of the fingerprint matching and camera identification processes, with respect to the prior art.

A further advantage of the method for fingerprint matching and camera identification according to the present invention is that it allows to have scalability during the fingerprint matching process. With the term "scalability" it is meant that the compressed fingerprints can be trimmed to an arbitrary length to optimally adapt the computational complexity of the search in database 5 and the bandwidth required for the communication between database 5 and device 3.

The method, the device and the system for fingerprint matching and camera identification described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a method, a device and a system for fingerprint matching and camera identification, but may be subject to many modifications, improvements or replacements of equivalent parts and elements without departing from the inventive idea, as clearly specified in the following claims.

The invention claimed is:

1. A method for fingerprint matching and camera identification, comprising:
    reading, through a device, a camera fingerprint extracted from a picture or a set of pictures taken by a camera;
    calculating a compressed version of said camera fingerprint through a random projections technique;
    correlating the compressed version of said camera fingerprint with fingerprints stored in a database in order to identify a camera that took the picture or the set of pictures, wherein the fingerprints are associated with cameras in a database stored in memory means; and
    determining the camera that took the picture or the set of pictures when a correlation between the compressed version of said camera fingerprint and at least one of the fingerprints is larger than a threshold.

2. The method according to claim 1, wherein said calculating is carried out through a multiplication between a sensing matrix ($\Phi$) and said camera fingerprint, said sensing matrix ($\Phi$) having a row size smaller than the size of said camera fingerprint.

3. The method according to claim 2, wherein said sensing matrix ($\Phi$) is a circulant matrix.

4. The method according to claim 2, wherein said sensing matrix ($\Phi$) comprises independent and identically distributed Gaussian random variables.

5. The method according to claim 2, wherein said sensing matrix ($\Phi$) comprises independent and identically distributed Rademacher random variables.

6. The method according to claim 2, wherein said sensing matrix ($\Phi$) comprises independent and identically distributed Bernoulli random variables.

7. The method according to claim 2, wherein said multiplication between said sensing matrix ($\Phi$) and said camera fingerprint is carried out by the use of the FFT, or Fast Fourier Transform.

8. The method according to claim 1, further comprising applying scalar quantization to said compressed version of said camera fingerprint, and wherein said scalar quantization can be carried out with an arbitrary number of bits.

9. The method according to claim 2, further comprising applying said sensing matrix ($\Phi$) to both noise residual (w) of a test image (It), of which it is desired to know which camera took it, and at least one fingerprint stored in the database.

10. The method according to claim 9, wherein said compression is applied to said database, comprising the camera fingerprints, and said method provides for storing in said database a seed of a pseudorandom number generator that allows to generate said sensing matrix ($\Phi$).

11. The method according to claim 9, further comprising storing in said database scale-invariant and rotated versions of compressed fingerprints.

12. The method according to claim 11, wherein the computation of said scale-invariant versions of compressed fingerprints is implemented via the two dimensional DFT, or Discrete Fourier Transform, using as sensing matrix ($\Phi$) a BCCB matrix, or Block Circulant with Circulant Blocks matrix, obtained from a properly scaled random pattern, i.e., based on the size of said camera fingerprint, and via properly cropping and rescaling random projections.

13. The method according to claim 12, further comprising cropping and rescaling said random projections of a test fingerprint to match the compressed fingerprint stored in said database, using a set of parameters storable in said database, said parameters consisting in a position and a size of an area to be cropped and a size of the uncompressed fingerprint.

14. A device for fingerprint matching and camera identification configured for communicating with said memory means adapted to store camera fingerprints and carrying out the method according to claim 1.

15. A system for fingerprint matching and camera identification, comprising a device and said memory means, said device being configured for communicating with said memory means adapted to store camera fingerprints and carrying out the method according to claim 1.

16. A computer product which can be loaded into a memory of a device comprising portions of software code adapted to implement the method according to claim 1.

* * * * *